United States Patent
Graves et al.

(10) Patent No.: US 7,106,345 B2
(45) Date of Patent: *Sep. 12, 2006

(54) MECHANISM FOR COLOR-SPACE NEUTRAL (VIDEO) EFFECTS SCRIPTING ENGINE

(75) Inventors: Eric Graves, Mountain View, CA (US); Randall H. Ubillos, Los Altos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/129,515

(22) Filed: May 13, 2005

(65) Prior Publication Data

US 2005/0212813 A1    Sep. 29, 2005

Related U.S. Application Data

(63) Continuation of application No. 09/728,072, filed on Nov. 30, 2000, now Pat. No. 6,903,748.

(60) Provisional application No. 60/196,465, filed on Apr. 11, 2000.

(51) Int. Cl.
*G09G 5/02* (2006.01)

(52) U.S. Cl. ............... 345/604; 345/589; 345/592; 345/605

(58) Field of Classification Search ............ 345/604, 345/589, 592, 605
See application file for complete search history.

(56) References Cited

U.S. PATENT DOCUMENTS

| 6,151,030 | A  | * | 11/2000 | DeLeeuw et al. | 345/592 |
| 6,239,829 | B1 | * | 5/2001  | Curry | 347/251 |
| 6,429,877 | B1 | * | 8/2002  | Stroyan | 345/611 |
| 6,469,706 | B1 | * | 10/2002 | Syeda-Mahmood | 345/589 |
| 6,501,480 | B1 | * | 12/2002 | MacInnis et al. | 345/538 |

\* cited by examiner

*Primary Examiner*—Kee M. Tung
*Assistant Examiner*—Mike Rahmjoo
(74) *Attorney, Agent, or Firm*—Blakely, Sokoloff, Taylor & Zafman LLP

(57) ABSTRACT

A first command is retrieved from a script containing one or more commands written for a first color space. The first command is associated with zero or more input buffers and zero or more output buffers. The first command has zero or more parameters. A behavior of the first command in the first color space and in a second color space is determined. The behavior comprises one of unique behavior, transparent behavior, and different behavior. The first command has the unique behavior when the first command only operates in the first color space. The first command has the transparent behavior when the first command generates similar results in the first color space and in the second color space. The first command has the different behavior when the first command generates different results in the first color space and in the second color space. Using the behavior of the first command, an operation associated with the first command is processed. The operation is processed in a preferred format based on current formats of the input buffers.

9 Claims, 5 Drawing Sheets

MECHANISM FOR COLOR-SPACE NEUTRAL (VIDEO) EFFECTS SCRIPTING ENGINE

This application is a continuation application of U.S. Pat. application ser. No. 09/728,072, filed Nov. 30, 2000, now U.S. Pat. No. 6,903,748, which also claims priority to a provisional application filed on Apr. 11, 2000 having the Ser. No. 60/196,465.

FIELD OF THE INVENTION

The present invention relates generally to the field of computer graphics, more specifically to the processing of images using scripts and a scripting engine.

BACKGROUND OF THE INVENTION

In computer graphics, traditionally colors are represented using a combination of primary colors. For example, in the RGB color space, the colors Red, Green and Blue are blended together to get a range of colors. In order to manipulate images in the RGB color space, scripting languages are designed to allow the users to create scripts that describe image-processing operations at a high level. For example, a script can be written to handle transition between two video clips or between one video clip and one still video. The scripts do not necessarily work only with transitions. They may also be written to work with single source clips. For example, a script that takes an existing clip of video and drop colors on it. The scripts may also be "generators" which have no inputs but create an output.

Final Cut Pro (FCP) is a movie editing and creating software produced by Apple Computer, Inc. of Cupertino, Calif. ("Apple"). It includes a scripting engine. The FCP scripting engine allows users to write scripts which perform various image manipulations, ranging from basic operations such as "blend" "channelfill" and "multiplyChannels" to more complex operations such as "levelmap" and "colorkey." Of course, most scripts combine more than one of these operations to build interesting effects or transitions.

These functions operate on one or more images. Consider these examples. "Channelfill" fills in one or more color channels of a destination buffer with the color values passed to it. "Levelmap" applies a lookup-table to one or more channels of "source" and puts the results of the lookup into "destination". "Blend" blends "source 1" and "source 2" together into "destination", based on a ratio passed in. These scripting engine commands, or sometimes referred to as image processing calls or functions, were shipped with many other commands in version 1.0 of FCP from Apple. In addition, there are many scripts written by the users of FCP.

In the past, it was assumed that the scripts were written to operate in the RGB color space, 8 bits per color component, and the scripting engine only performed the image processing in the RGB color space.

SUMMARY OF THE INVENTION

In one embodiment, a method of processing image processing commands in a script is disclosed. A command is retrieved from a script containing one or more commands written for a first color space. The command is associated with zero or more input buffers and zero or more output buffers. The command has zero or more parameters. A behavior of the command in the first color space and in a second color space is determined. The behavior comprises one of unique behavior, transparent behavior, and different behavior. The command has the unique behavior when the command only operates in the first color space. The command has the transparent behavior when the command generates similar results in the first color space and in the second color space. The command has the different behavior when the command generates different results in the first color space and in the second color space. Using the behavior of the command, an operation associated with the command is processed. The operation is processed in a preferred format based on current formats of the input buffers.

BRIEF DESCRIPTION OF THE DRAWING

The present invention is illustrated by way of example and not limitation in the figures of the accompanying drawings, in which like references indicate similar elements and in which.

DETAILED DESCRIPTION

A method and logic for performing image-processing operations in a preferred color space using scripts written for another color space are described. In the following description, for purposes of explanation, numerous specific details are set forth in order to provide a thorough understanding of the present invention. It will be evident, however, to one skilled in the art that the present invention may be practiced without these specific details.

Scripts generally consist of building blocks that are image processing commands (e.g., fill, blend, etc.). Each image processing command may require one or more input and output buffers. The input and output buffers are used to store the images. It is the scripting engine that parses the image processing command and obtains the buffers to be used with that image processing command.

Figure 1:
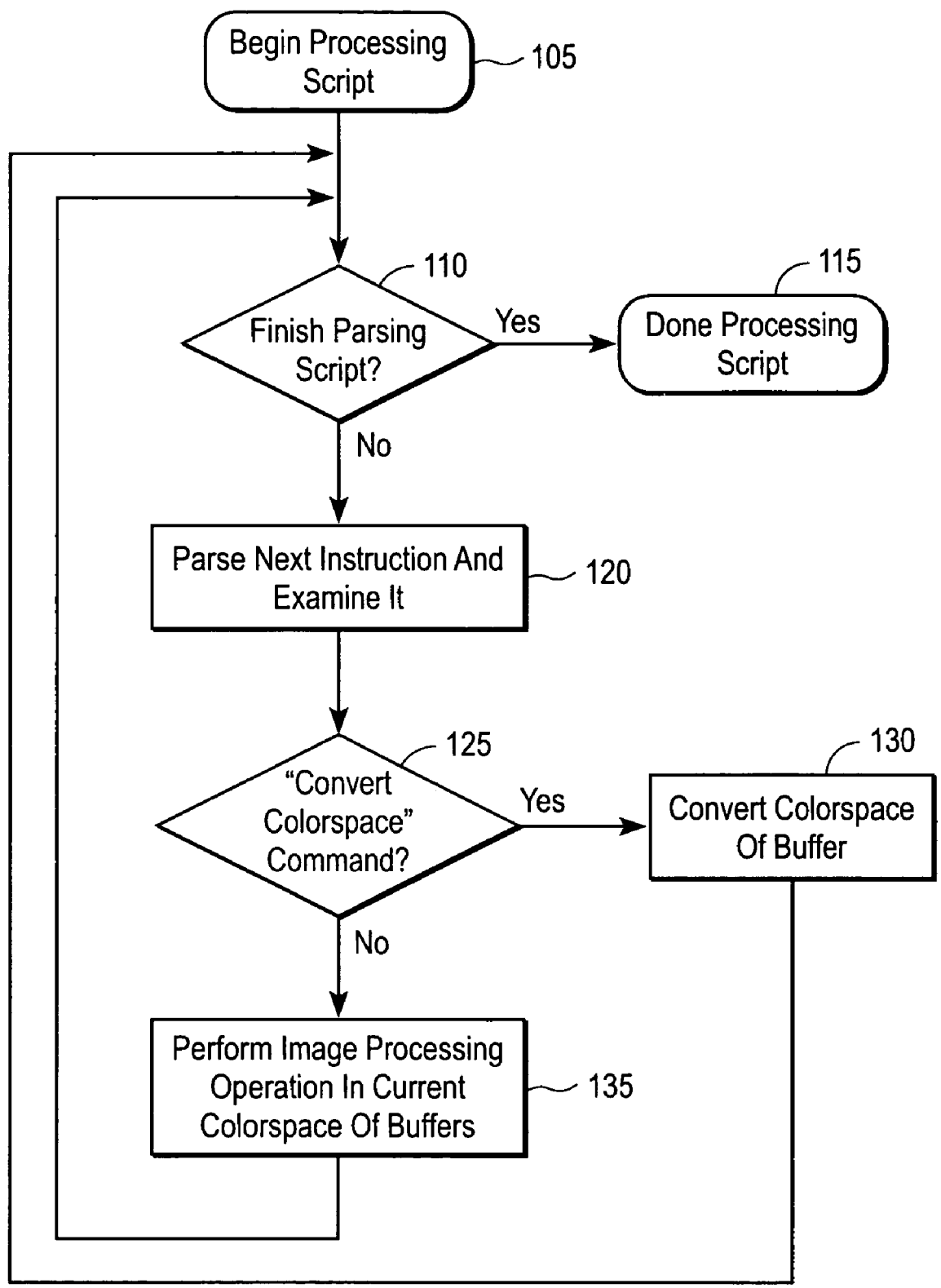
FIG. 1 is a simplified flow diagram illustrating one method of processing scripts which use more than one color space but does not allow the script to operate transparently.

FIG. 1 is an exemplary flow diagram illustrating one method of processing scripts written for one color space. The flow diagram starts at block 105. The script is parsed for a next processing command. At block 110, a determination is made to see if all the processing commands in the script have been parsed from the script (i.e., finish parsing the script). When the parsing is finished, the flow diagram ends at block 115. When there are still more commands to be parsed, a next command is parsed and examined, as shown in block 120. Generally, to manipulate an image that was created or manipulated in a first color space in a second color space, an image conversion from the first color space to the second color space is performed. At block 125, a determination is made to see if the processing command parsed in block 120 is a "convert colorspace" command. When it is a convert color space command, the input buffer is converted from a current source color space to a destination color space. When the command is not a convert colorspace command, the script engine performs the image processing operation in the current color space, as shown in block 135. The flow moves from block 135 or block 130 back to block 110 to continue parsing the remainder of the script.

The image conversion from one color space to another color space performed in block 130 generally results in loss of color resolution, etc. Furthermore, there may be one or more colors that can be represented in the first color space but not in the second color space (i.e., converted colors falling out of the edges of the second color space). Thus, it would be advantageous to avoid the extra or unneeded colorspace conversion. Note that this example also requires scripts to be rewritten to function in a second color space. The present invention allows existing scripts to operate in the second color space without having to be rewritten.

For the purpose of describing the methods of the present invention, the RGB color space is used as an example to represent the first color space. The RGB color space may also be referred to as "ARGB" where A is an alpha or zero'th component, R is a first component, G is a second component and B is a third component. The YUV color space is used as an example to represent the second color space. The YUV color space is another way of representing colors, like the RGB color space. Thus, for example, the color red can be represented in either the RGB color space or in the YUV color space. The YUV color space is often referred to as "YCrCb," "YCbCr," or "AYCrCb", where A is the alpha or zero'th component, Y is the first component, etc. The alpha or zero'th component indicates transparency of the color. The alpha value determines whether the associated color will completely cover up any other colors underneath. The YUV color space is normally used in video. For example, broadcast television is broadcast in YUV color space. Advantages of processing images in the YUV color space instead of in the RGB color space include high image fidelity, rendering performance, etc.

Thus the methods of the present invention allows most of the existing RGB scripts to be performed in the YUV color space to take advantage of the enhanced features of the YUV color space. In addition, the methods of the present invention do not require the users to modify all of the scripts for the YUV color space. Of course, when the users write new scripts with knowledge of the YUV color space, the scripting engine performs the image processing operations in the YUV color space. These new scripts are referred to as "YUV-only" or "YUV-aware" scripts and are not backward compatible with older versions of the scripting engine.

In one embodiment, the scripting engine in the present invention is capable of accepting scripts written in RGB format, YUV format or a combination of RGB and YUV formats. This capability allows the scripting engine to be compatible with existing ("old-style") scripts written in the RGB format. In addition, the scripting engine also recognizes scripts written for the YUV format (i.e., scripts that are YUV-aware or YUV-only). It would be apparent to one skilled in the art that the scripting engine may be configured to be compatible with other formats in addition to the RGB and YUV formats. Furthermore, it would be apparent to one skilled in the art that the scripting engine may perform image processing in another color space, instead of the YUV color space, without departing from the scope of the invention.

The image processing commands may operate on one or more components (e.g., alpha, first component, etc.) of the image. In one embodiment, the image processing commands in the script are examined to determine a best approach to perform the image processing operations associated with these commands. For example, it may be possible that the image processing command may be executed to perform image processing operations in the second color space with minimal or no color space conversion. In a best case situation, most of the image processing commands examined can be performed in the YUV color space and thus no color space conversation is necessary. However, this is not generally the case. The methods of the present invention operate based on recognition that some image processing commands can be performed in the RGB color space (i.e., first color space) or in the YUV color space (i.e., second color space). That is, these image processing commands make sense in either color space and can be performed by the scripting engine for either color space.

These image processing commands are categorized in two different groups. With a first group, there is no difference in visual results regardless whether the commands are performed in the RGB color space or in the YUV color space. These image-processing commands in the first group are referred to as "transparent" commands. With a second group, there is a difference in visual results when the commands are performed in the RGB color space and in the YUV color space. These image-processing commands in the second group are referred to as "different" commands. As will be described below, better results can be obtained by the embodiment of the invention which knows how to convert some image processing commands—which at first glance would appear to fall into the second group—into commands which fall into the first group and therefore can be performed in the YUV colorspace.

In addition, some image processing commands are written to work only with the RGB color space. That is, they can not be performed by the scripting engine in the YUV color space. These image-processing commands are referred to as "RGB-only" commands. In these situations, the commands are first performed in the RGB color space. A conversion to the YUV color space may be subsequently performed.

Figure 2:
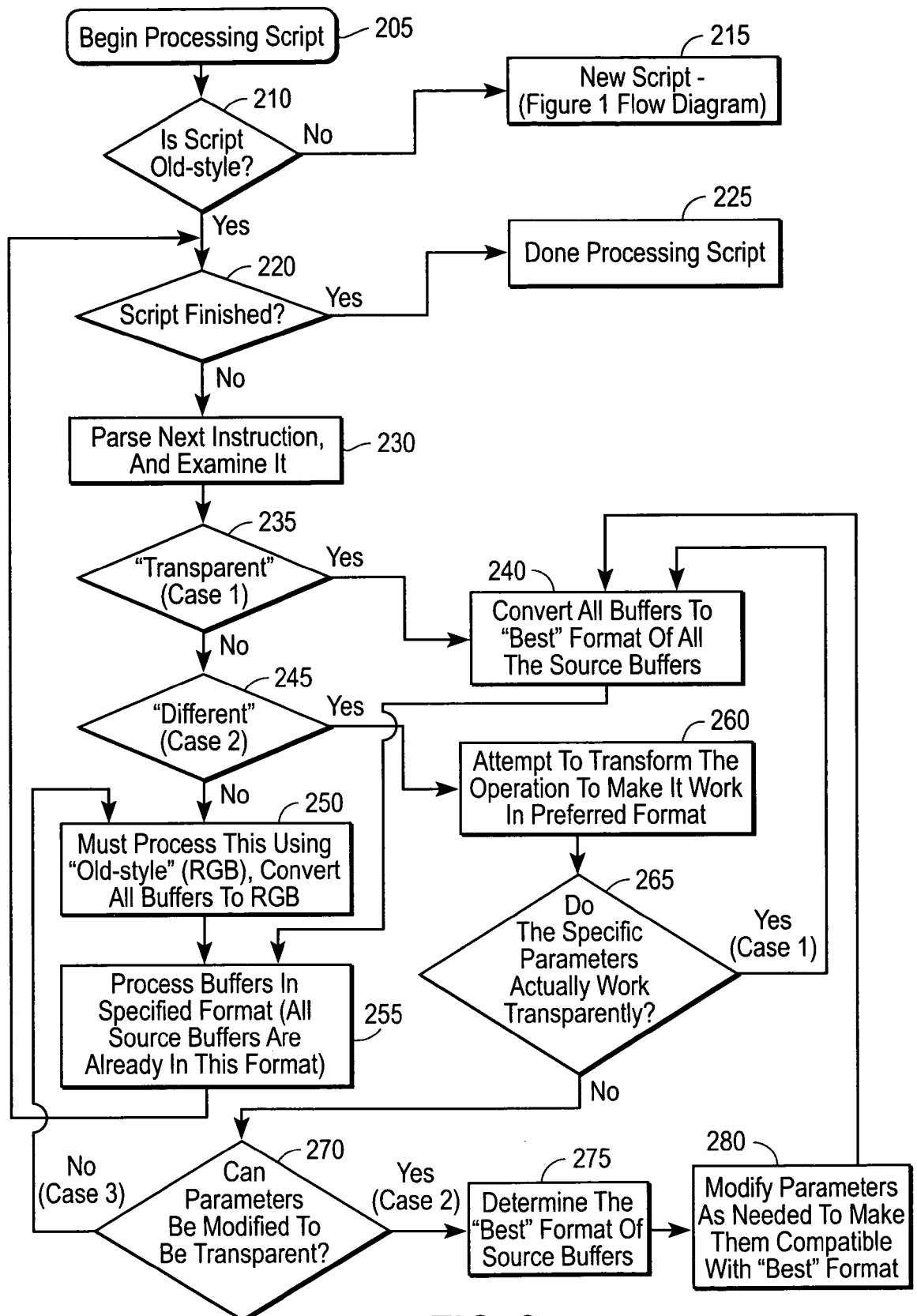
FIG. 2 is an exemplary flow diagram illustrating one embodiment of the method of identifying the image processing commands.

FIG. 2 is an exemplary flow diagram illustrating one embodiment of the method of identifying the image processing commands. The flow diagram starts at block 205 where the script is parsed for a next processing command. At block 210, a determination is made to see if the script was written in the RGB format ("old style"). If the script is not written in the RGB format, then it is determined to have been written using the YUV format ("new style"). That is, these "new style" image processing instructions are already YUV aware and thus can be processed directly with the YUV color space, as shown in block 215. For a new-style script, (eg, one which is YUV-aware or YUV-only, the commands would not cause a color space conversion because it would be up to the script-writer to ensure that the color space matches the desired visual result.

When the script was written using the RGB format, the flow moves to block 220 where a determination is made to see if all the processing commands in the script have been parsed from the script (i.e., finish parsing the script). When the parsing is finished, the flow diagram ends at block 225. When there are still more commands to be parsed, a next command is parsed and examined, as shown in block 230.

At block 235, a determination is made to see if the image processing command is a "transparent" command—one which does not depend on the color space and can be performed in either color space. In one embodiment, a knowledge base is formed to allow the scripting engine to identify those image-processing commands that are of the "transparent" type. This knowledge allows the existing ("old-style") scripts (e.g., scripts written in the RGB format) to run unmodified.

In one embodiment, when the image-processing command is of the type "transparent", and when there are multiple inputs, a determination is made to decide a best format from the format of the input buffers to process the command, as shown in block 240.

In one embodiment, in order to determine which color space to perform an operation in, the invention will look at all of the source buffers whose color space matters, and the current color space of the output buffer. An embodiment may then choose the "best" color format based on any number of criteria. In one embodiment, the decision of best format may be made based on the determination that if any of the source or destination buffers are in the YUV color space, the "best" processing format is the YUV format, otherwise the "best" processing format is the RGB format. One skilled in the art would recognize that other more complex criteria to determine the "best" format may also be used. For example, the decision may involve looking at future upcoming image processing commands involving the same buffers, in order to reduce the total number of color space conversions performed in complex operations. At block 240, the input buffers are converted to the "best" format. Following is an example of a "transparent" command:

"Blend Image A with Image B"

The image A may be a first video clip and the image B may be a second video clip, where the first video clip is in the YUV format and the second video clip is a still image in the RGB format. Since the first video clip is in the YUV format, the input buffer corresponding to the second video clip is converted from the RGB format to the YUV format. The result of this operation is in the destination or output buffer in the YUV format.

Going back to block 235, if the command is not a "transparent" command, the flow moves to block 245. Here, a determination is made to see if the command is a "different" command—one which may have different output results depending upon the colorspace it is performed in. As discussed earlier, it is preferable to process the command without having to do any color space conversion. Following is an example of a "different" image processing command:

"Fill One or More Color Channels with a Particular Value."

Depending upon factors such as which channels are being filled and whether the script uses an old-style format (e.g., RGB) or a new-style format (e.g., YUV), the above command may operate in different ways. That is, the command may provide the same or different visual results when processed in each color space. For this reason, it is considered a "different" operation. As will be described below, depending on the situation, the "different" command may be mapped into various cases of "transparent" command or, if not able to be mapped, the command is treated as "RGB-only" command.

At block 260, the "different" command is examined to see if it can be transformed or mapped into a "transparent" command to make it work in the preferred format ("YUV"). At block 265, the command parameter(s) are examined to determine if the command can actually work transparently in the preferred color space ("YUV color space"). When this is the case (i.e., case 1), the flow moves to block 240 where all the buffers are converted. Consider the following example:

"Set the Zero'th Color Component to Maximum".

This command increases the alpha component (i.e., zero'th color component) of the image regardless whether it is performed in the RGB color space or in the YUV color space. This is a case 1 example. That is, in both color spaces, this command will increase the alpha without actually impacting the actual color. There is no difference in the visual results whether the underlying image was in the RGB color space or in the YUV color space.

Going back to block 265, if the parameter(s) of the "different" command do not allow the command to operate transparently, the flow moves to block 270. At block 270, a determination is made to see if the parameter(s) can be modified so that the command can be processed transparently in the preferred color space. If this is the case (e.g., case 2), the flow moves to block 275 where the best format of the source buffers is determined. A discussion about choosing the best format was discussed earlier for block 240. At block 280, the parameter(s) is modified as needed to be compatible with the best format. The flow then moves to block 240 where all the buffers are converted to the best format.

Going back to block 270, when the parameters cannot be modified to allow the command to operate transparently, the RGB format is used. Consider the following example:

"Set the First Color Component to Maximum".

This command increases the color RED (i.e., first color component) of the image. This is because the script was written as an old-style script and thus it assumes its commands are to be performed in the RGB color space. This command is also recognizable for the YUV color space. However, when this same command is performed in the YUV color space, the command increases the first color component Y (or "Luminance") and makes the image brighter. That is, even though the command makes sense in either color space, different visual results are achieved when the command is performed in the RGB color space and in the YUV color space.

Going back to block 245, when the command is not a "different" command, then the command is "unique" to the RGB color space. In this case, the command makes sense only in the RGB color space and can only be processed in the RGB color space with input buffers in the RGB format, as shown in blocks 250 and 255.

Figure 3:
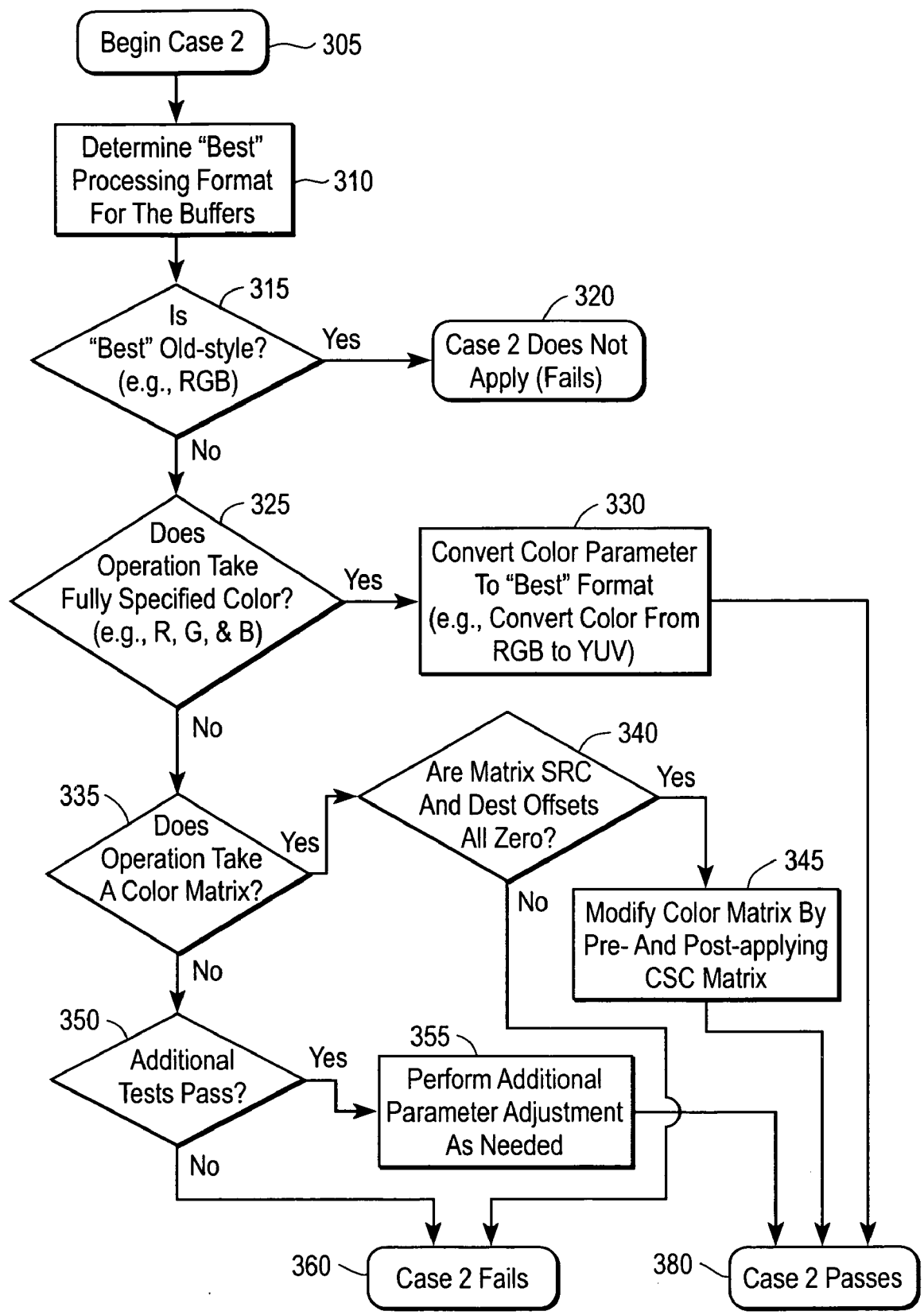
FIG. 3 is an exemplary flow diagram illustrating one embodiment of transforming a "different" command so that it can be processed without color space conversion.

FIG. 3 is an exemplary flow diagram illustrating one embodiment of a process of transforming a "different" command. The process describes how the "Different" or "case 2" type command is performed without color space conversion. This process continues from block 245 in FIG. 2. The process starts at block 305. At block 310, the "best" processing format (e.g., RGB or YUV) for the image processing command is determined. At block 315, a determination is made to see if the best format determined in block 310 is the first format or the "old-style" format (e.g., RGB). If the best format is the same as the old-style format, then case 2 does not apply, as indicated at block 320. From block 320, the process continues with block 250 in FIG. 2.

From block 315, if the "best" format is not the same as the old style format, the process moves to block 325 where the color values passed in is examined to determine if the color is "fully specified." "Fully Specified" means that all color components are provided by the command, as in the following example:

"Fill R, G, and B with Color x1, x2, x3."

When the color is fully specified, the flow moves to block 330. At block 330, the fully specified RGB triplet (x1, x2, x3) is converted into the YUV triplet (y1, y2, y3). Once the conversion in block 330 is done, the process moves to block 380 and the case 2 passes. In this case, the command is performed with a new equivalent color in the second color space.

From block 325, when the command does not take the fully specified color, the process moves to block 335 where it is determined if the command takes a color matrix. A color matrix is a mathematical representation of a way of changing the color of each pixel in an image. A color matrix operation is used to convert between from one color space to another color space (e.g., RGB to YUV). The color matrix operation consists of "n" source offsets applied to each of the incoming color channels. For example, when n=3, the color channels are R, G and B. The color matrix operation also consists of an n×n matrix which is applied to the color channels and "n" destination offsets.

Scripts apply a particular color matrix to an RGB image in order to perform a particular effect. However, for performance and quality reasons and depending on the source and destination effects, it is sometimes possible to apply this RGB-specific matrix to a YUV image in one operation through matrix concatenation. From block 335, if a color matrix is used by the operation, the process moves to block 340, which examines some additional characteristics of the color matrix to see if the color processing can be performed in the preferred color space.

In one embodiment, block 340 examines the "source" and "dest" offset values and compare them to zero. If this test passes, then the process moves to block 345 where the matrix is mathematically transformed, by pre- and post-applying appropriate color space matrices—a technique known to one skilled in the art. For example, it is sometimes possible to apply an RGB-specified matrix "m1" to a YUV image and generating a YUV image result. Instead of using "m1", a new matrix "m2" is used, where m2=toR×m1×toY, where toR is the YUV to RGB matrix, and where toY is the RGB to YUV matrix. This allows the matrix "m1", which was specified in the first color space (e.g., RGB), to be directly applied to an image in the second color space (e.g., YUV) in one operation, without first converting the color space of the image. This technique allows for greater processing image quality and improved performance.

From block 335, if the command does not take a color matrix, then case 2 does not apply and the process moves to block 350. Block 350 and 355 represent the fact that this technique may be applied to other image processing commands besides the examples described in the previous blocks. When case 2 does not apply, the process moves to block 360. From block 360, the process continues at block 250 in FIG. 2.

Figure 4:
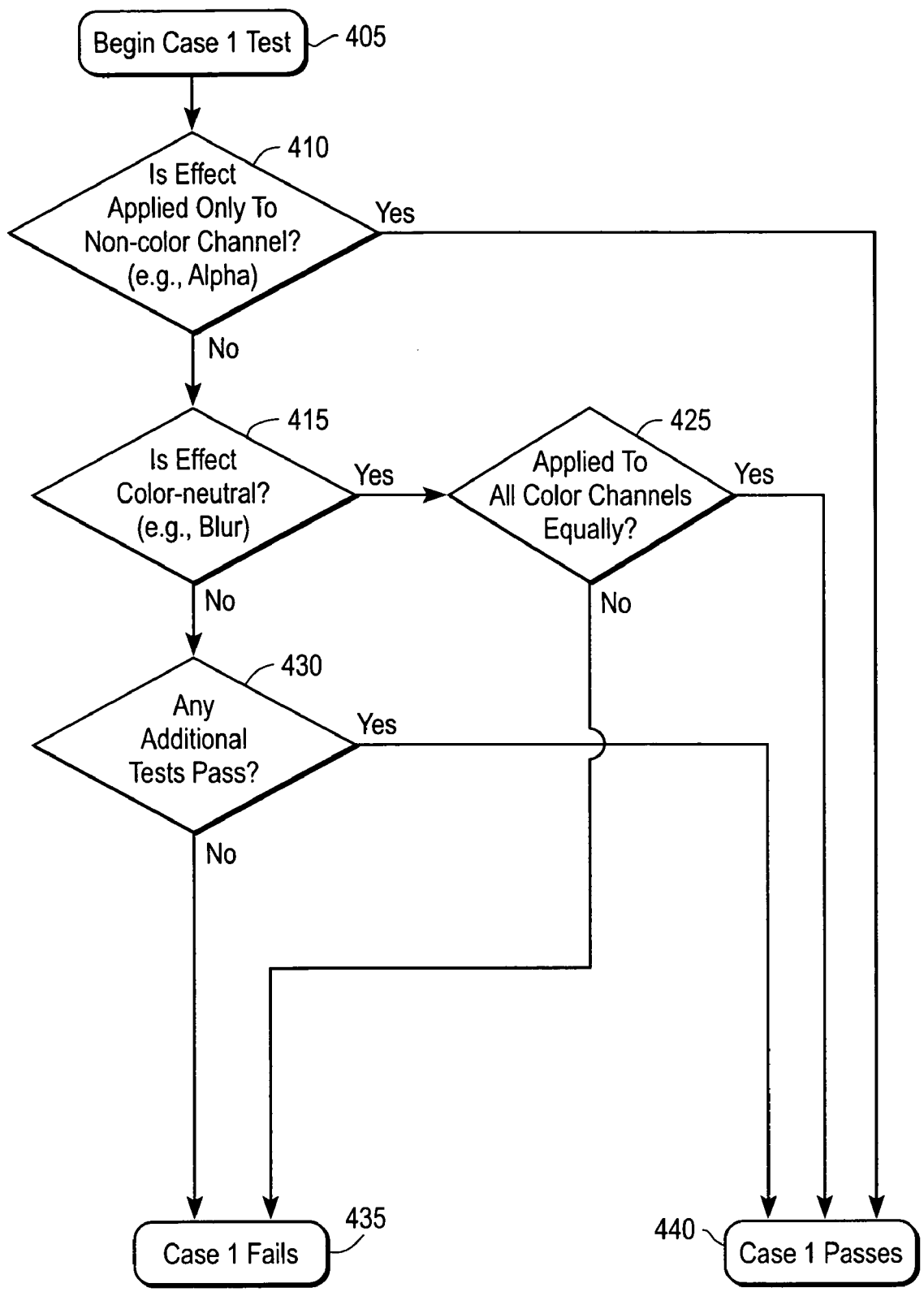
FIG. 4 is an exemplary flow diagram illustrating one embodiment of processing a transparent command.

FIG. 4 is an exemplary flow diagram illustrating one embodiment of processing a transparent command. FIG. 4 describes in more detail the decision process covered in block 235 of FIG. 2, where we determine whether an image processing command can be processed transparently ("case 1"). The process starts at block 405 to begin case 1 test. At block 410, a determination is made to see whether the command is being applied only to non-color channel data (e.g., the alpha channel only). For example, command may be:

"Set the Zero'th Color Component to Maximum."

When the command affects only with non-color channel data, the process moves to block 440 and the command is categorized as case 1. From block 440, the process moves to block 240 in FIG. 2. When the command does not affect the non-color channel data, the process moves to block 415 where a determination is made to see whether the effect of the command is color-neutral such as, for example, a blend operation. If the image processing command is color-neutral, the process moves to block 425, where it is determined if the effect is applied to all color channels equally. When this is the case, the process moves to block 435 and case 1 does not apply. From block 435, the process moves to block 245 of FIG. 2. From block 425, if the command applies to all color channels equally, the process moves to block 440 where case 1 applies. From block 440, the process moves to block 240 of FIG. 2. For example, the following "Blend" operation applies to all color channels:

"Blend Image A with Image B."

From block 425, if the command does not apply to all color channels, case 1 does not apply. For example, when the command applies only to the RED channel, Then the command cannot be performed transparently. In this case, the process moves to block 435 where case 1 does not apply. From block 435, the process continues with block 245 in FIG. 2.

From block 430, a determination is made to see if there are any additional test cases for the transparent operation (e.g., case 1) as this method may be applied to many image processing commands. If any of the additional tests pass for case 1, then the process continues to block 440 which continues to block 240 in FIG. 2.

When the commands involve "fill one or more channels", there is not an efficient way of adjusting the Red without impacting Green and Blue within the YUV color space, as determined by block 270. As such, the engine treats this as an RGB-only operation (i.e., case 3). In case 3 situations, the scripting engine will convert to RGB color space to perform the operation.

While the basic command "fill one or more channels with values" is considered to operate "differently," the invention's embodiment recognizes that command that fully specify a color in the RGB color space can be transformed into an equivalent command that fully specify a color in the YUV color space. In one embodiment, the input of the command is examined to determine a preferred operating format (e.g., RGB or YUV). For example, if the input buffer for the command is already in the RGB format, then this command is performed in the RGB color space. This is because it may be more efficient to let the input be processed in the RGB color space to avoid having to do any color space conversion. However, if the input is already in the YUV format, then the image processing command is transformed into a YUV implementation with the same visual results as the RGB implementation. This new YUV implementation is can be "YUV-processed" because it is written for the YUV color space. Consider the following RGB format command example:

"Fill R, G. and B with Color 'x1,x2,x3'".

This command may be transformed into the following YUV format command:

"Fill Y, U, and V with Color 'y1, y2, y3'"

where the color 'y1,y2,y3' in the YUV color space is identical to the color 'x1,x2,x3' in the RGB color space. Using the YUV implementation of the image processing command avoids having to convert the input image from the YUV format to the RGB format just so that the RGB-specified image processing command can be performed. Thus, the decision to create the YUV implementation of the image processing command may be dependent on the format of the input.

Consider the following more concrete example of how one embodiment of the method of the present invention handles the RGB-specified command for YUV-processing:

"Fill the Red Channel with 128, the Green Channel with 128, and the Blue Channel with 200."

This command is specified in the RGB color space. Upon initial examination, it may be determined that the command must be performed in the RGB colorspace. However, upon further examination of the input buffers, it may be better to process the command in the YUV color space using the corresponding YUV implementation of the command. This is because, in one embodiment, when the input buffer is already in the YUV format, the corresponding YUV command is used.

This YUV implementation is "YUV-processed". For example, the RGB triplet (128, 128,200) corresponding to the RGB command above is converted into the YUV triplet (144, 162, 122) corresponding to the following YUV implementation of the same command:

"Fill the Y, U and V Channels with (144,162,122)."

Thus, without the script's knowledge, this "RGB-specified" command from an old-style script is transformed and performed in the YUV color space.

In one embodiment, each image processing command is attached with an identifier referred to as a "capability token". The capability token helps the scripting engine recognizes the type of processing command. For example, a list of processing token may comprise the following tokens:

"operatesTransparently," "operatesDifferently," "operatesRGBonly," etc.

Each of the processing token has a specific meaning, depending upon whether the script is an existing script or a new ("YUV-aware" or "YUV-only") script.

Thus, the preferred color space to perform the image processing command is selected based on whether the script is "YUV-aware"/"YUV-only," the current format of the input buffers, and the "capability token" associated with the image processing command.

Figure 5:
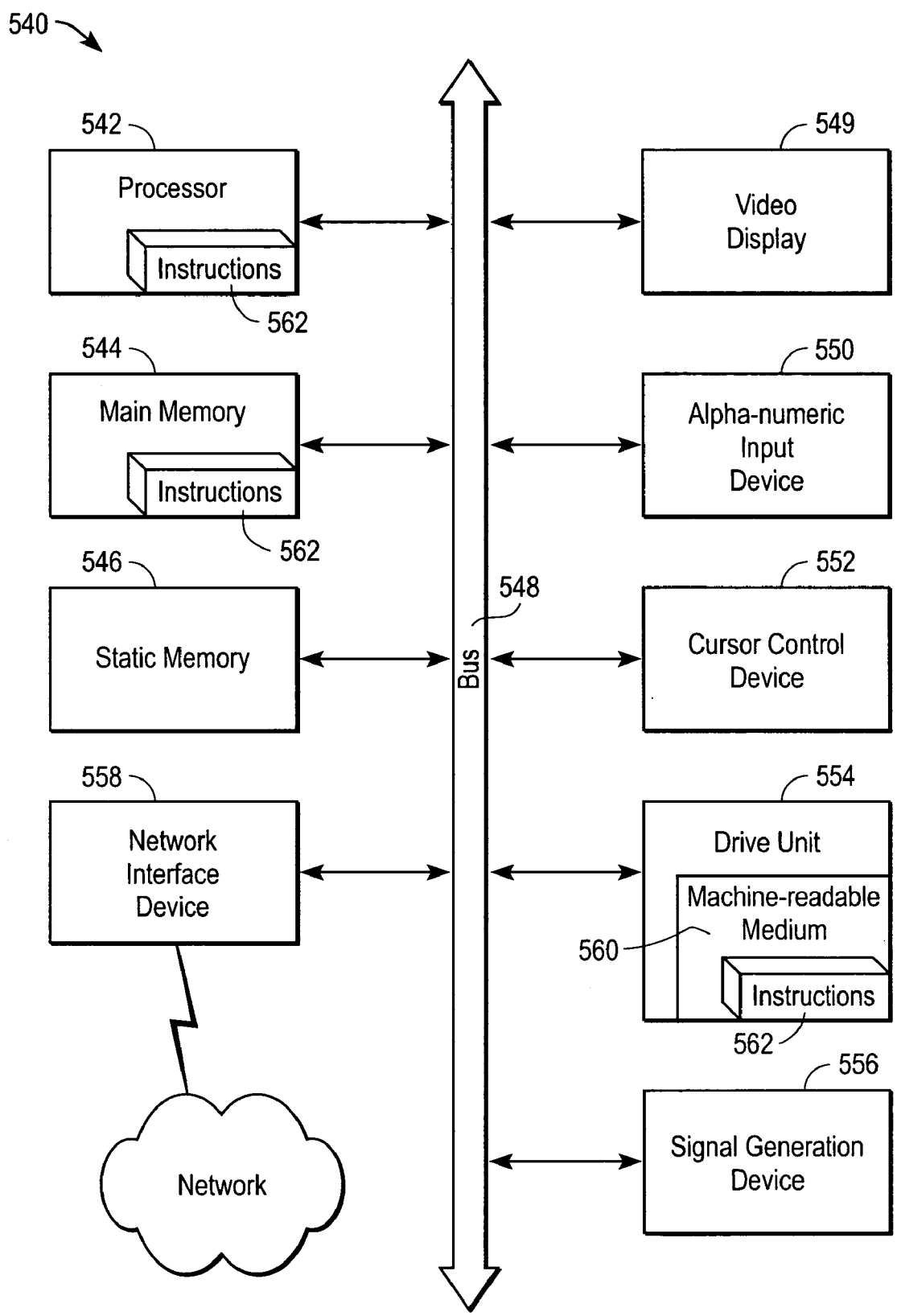
FIG. 5 is a block diagram illustrating a machine, in the exemplary form of a computer system where the method of the present invention may be practiced.

FIG. 5 is a block diagram illustrating a machine, in the exemplary form of a computer system 540, within which a set of instructions, for causing the computer system 540 to perform any one of the methodologies discussed above, may be executed. The computer system 540 includes a processor 542, a main memory 544, and a static memory 546 that communicate with each other via a bus 548. The computer system 540 further includes a video display unit 549 (e.g., a liquid crystal display (LCD) or a cathode ray tube (CTR)). The computer system 540 further includes an alpha-numeric input device 550 (e.g., a keyboard), a cursor control device 552 (e.g., a mouse), a disk drive unit 554, a signal generation device 556 (e.g., a speaker) and a network interface device 558.

The disk drive unit 554 includes a machine-readable medium 560 on which is stored a set of instructions (i.e., software 562) embodying any one, or all, of the methodologies discussed above. For example, the software 562 may be the Final Cut Pro product from Apple. The software 562 is also shown to reside, completely or at least partially, within the main memory 544 and/or within the processor 542. The computer 540 may also include a network interface device 558 to transmit or receive data associated with the software 562.

For the purposes of this specification, the term "machine-readable medium" shall be taken to include any medium which is capable of storing or embodying a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and logic for handling image processing commands and a script engine that processes the scripts have been described. Although the present invention has been described with reference to the first format (e.g., RGB) and the second format (e.g., YUV), the present invention may be practiced with multiple existing formats to take advantage of features in a preferred format (or color space). In addition, the present invention may also be practiced with scripts written for the preferred format if the users so desire.

It will be evident that various modifications and changes may be made to these embodiments without departing from the broader spirit and scope of the invention. Accordingly, the specification and drawings are to be regarded in an illustrative rather than a restrictive sense.

What is claimed is:

1. A method which is implemented by a data processing system which includes a memory and a processor, the method comprising:
   determining a first command for a first color space to be one of:
      operating only in the first color space,
      generating similar results in the first color space and in a second color space, and
      generating different results in the first color space and in the second color space; and
   according to a result of said determining, arranging an operation associated with the first command to be processed in a preferred color space.

2. The method of claim 1, wherein:
   when the first command is determined to be operating only in the first color space, the preferred color space is the first color space;
   when the first command is determined to be generating similar results in the first color space and in the second color space, the preferred color space for the operation associated with the first command is to be determined to minimize color space conversion; and
   when the first command is determined to be generating different results in the first color space and in the second color space and when the preferred color space is the second color space, the first command is transformed to a second command in the second color space, wherein the second command performs a similar operation in the second color space as the first command in the first color space.

3. The method of claim 2, wherein when the first command is determined to be generating different results in the first color space and in the second color space and when the preferred color space is the second color space, one or more parameters of the first command are arranged to be transformed to comparable parameters for the second command such that the second command performs the similar operation in the second color space as the first command in the first color space.

4. The method of claim 3, wherein the comparable parameters are compatible with the preferred color space.

5. The method of claim 1, wherein said arranging the operation associated with the first command to be processed in a preferred color space comprises:

associating an identifier with the first command based on the result of said determining.

6. A computer readable medium having stored thereon sequences of instructions which are executable by a digital processing system, and which, when executed by the digital processing system, cause the system to perform a method comprising:

receiving a first command in a first color space; and processing an operation associated with the first command according to a behavior of the first command, wherein the behavior of the first command is:

unique when the first command operates only in the first color space, transparent when the first command generates similar results in the first color space and in a second color space, and different when the first command generates different results in the first color space and in the second color space.

7. The computer readable medium of claim 6, wherein the method further comprising:

determining a preferred color space to minimize color space conversion in processing the operation associated with the first command.

8. The computer readable medium of claim 7, wherein the preferred color space is determined based at least on the behavior of the first command and a color space of an input buffer of the first command.

9. The computer readable medium of claim 8, wherein when the behavior of the first command is different and the preferred color space is the second color space, the method further comprises:

transforming the first command to a second command in the second color space, wherein the second command generates a similar result in the second color space as the first command in the first color space.

* * * * *